Aug. 18, 1959  R. L. CARTER  2,900,195
STEERING MECHANISM FOR MOTOR VEHICLES
Filed June 28, 1956  6 Sheets-Sheet 1

INVENTOR.
ROBERT L. CARTER
BY
ATTY.

Aug. 18, 1959 R. L. CARTER 2,900,195
STEERING MECHANISM FOR MOTOR VEHICLES
Filed June 28, 1956 6 Sheets-Sheet 2

INVENTOR.
ROBERT L. CARTER
BY *J. Frederick Bechtel*
ATTY.

Aug. 18, 1959 R. L. CARTER 2,900,195
STEERING MECHANISM FOR MOTOR VEHICLES
Filed June 28, 1956 6 Sheets-Sheet 3

INVENTOR.
ROBERT L. CARTER
BY
ATTY.

Aug. 18, 1959   R. L. CARTER   2,900,195
STEERING MECHANISM FOR MOTOR VEHICLES
Filed June 28, 1956   6 Sheets-Sheet 4

*INVENTOR.*
ROBERT L. CARTER
BY
ATTY.

INVENTOR.
ROBERT L. CARTER

FIG. 8

United States Patent Office 2,900,195
Patented Aug. 18, 1959

2,900,195

STEERING MECHANISM FOR MOTOR VEHICLES

Robert L. Carter, Battle Creek, Mich., assignor to Clark Equipment Company, a corporation of Michigan Application June 28, 1956, Serial No. 594,571

7 Claims. (Cl. 280—95)

This invention relates to steering mechanism for vehicles and may be found particularly useful in industrial truck applications wherein very short turns, such as right angle turns within a narrow passage in order to pick up, deposit or tier a load at right angles to the general direction of the passage, and to make right angle turns from one narrow passage to another, are often required.

It has long been a problem in certain classes of motor vehicles, such as certain types of industrial trucks, in which available space is extremely limited, to devise a steering mechanism capable of facilitating very short turns without permitting substantial departure from calculated optimum differential angles of cramp between two dirigible wheels which are controlled in steering by a common source of actuation as they are actuated from one extreme angle of cramp to the other.

Although many attempts have heretofore been made to devise a steering mechanism for such classes of vehicles which would afford a near perfect angular differential between dirigible wheels at any and all steering cramp angles between, say, 90° left and right cramp of the respective wheels, none have, insofar as is known, been successful.

I have invented a steering mechanism which solves the above-mentioned problem by means of a novel steering linkage which, by permitting the dirigible wheels to be swiveled by control arms which are arranged to provide two radii of swing, results in a cramp angle differential between the two wheels which is continuously substantially equal to the calculated optimum of said angle as the wheels are turned from one extreme cramp angle position to the other. It is also very important to note that the extremely accurate steering angle control which is effected by my novel steering linkage is accomplished within a minimum of space.

It is therefore a primary object of this invention to provide steering mechanism within a limited amount of space by means of which a substantially optimum differential angle between two dirigible wheels is realized at any given steering angle between a neutral or zero steering angle and maximum right and left cramp steering angles.

It is a further object of this invention to provide steering mechanism for relatively closely spaced dirigible wheels of motor vehicles wherein a substantially optimum angular differential between said wheels is afforded at any given steering angle primarily by the provision of means affording two distinct radii of swing of control means which are operatively connected to the wheels.

Another object of this invention is to provide steering mechanism of the type specified herein which is relatively simple in structure, dependable in operation, and of low manufacturing cost.

These and other objects and advantages of this invention, which will appear to those skilled in the art after a reading of this description, are essentially realized as a result of the provision of a pair of crossed control arms which are pivoted at one end thereof about different centers of a pair of transversely spaced mounting means, a rigid member connecting the opposite ends of the control arms in fixed spaced relation during steering of the truck, and suitable means connecting said control arms to laterally spaced dirigible wheels for swiveling same in such a manner that actuation of said control arms about the pivotally mounted ends thereof effects a substantially optimum differential steering angle between the wheels, which, it has been found, results from the generation of a pair of laterally spaced arcs by opposite end portions of the rigid member, which arcs combine to form a portion of an approximately elliptical path. My steering mechanism is readily adapted for use with various sizes and classes of motor vehicles by suitable variation in design particulars which will be readily determinable by those skilled in the art following a study of the description which follows, and of the drawings wherein:

Figure 8 is a diagrammatic showing of a composite of Figures 4, 6 and 7 and illustrates the manner of generation of laterally displaced arcs by means of this invention.

Figure 1:
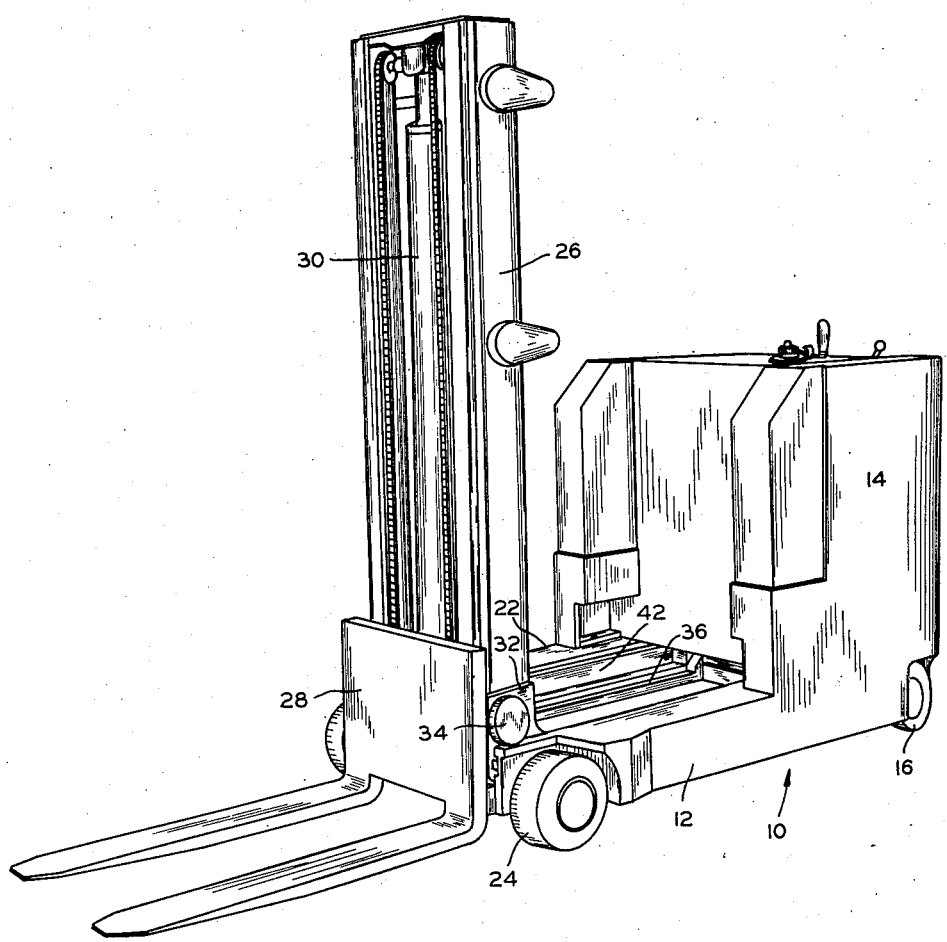
Figure 1 is a perspective view of one type of vehicle with which this invention may be used.
Figure 2:
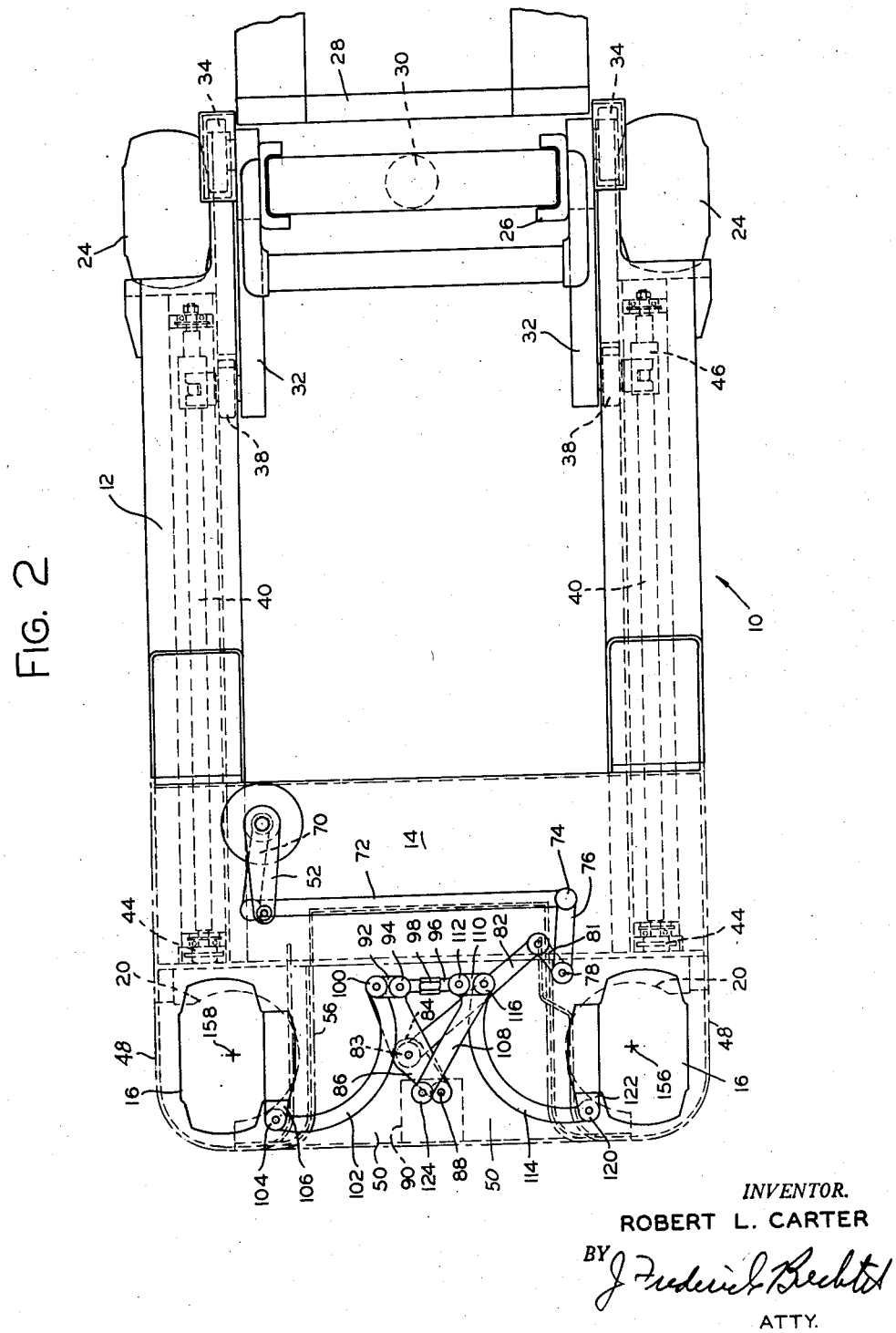
Figure 2 is a plan view of an industrial truck of the type shown in Figure 1 in which the after end is shown in phantom view and wherein is somewhat schematically illustrated a construction which embodies my invention.
Figure 3:
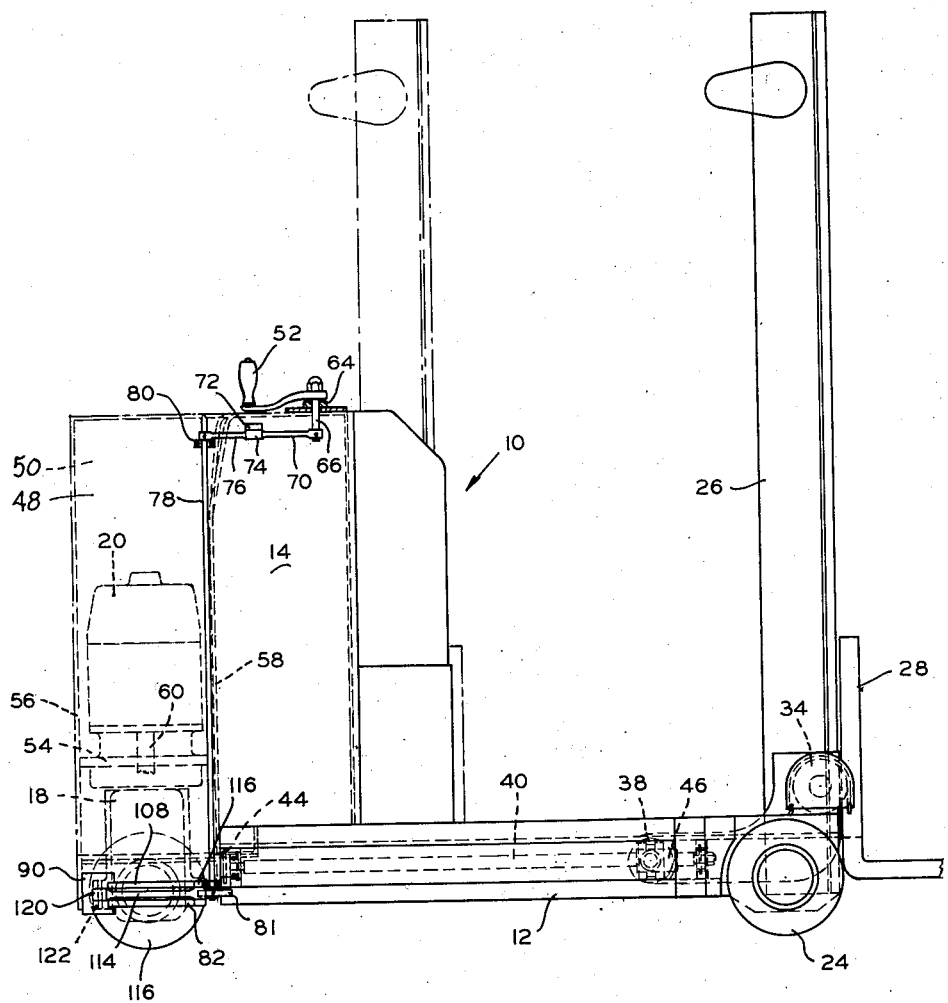
Figure 3 is a side elevation of the vehicle shown in Figure 2.

Referring now to Figures 1, 2 and 3, an industrial truck of the retractable and extensible mast type is shown generally at numeral 10 and comprises a forwardly extending U-shaped frame 12 having a vertically extending body section 14 at the rear portion thereof for housing a prime mover and a plurality of motors, pumps, clutches, and other components, not shown, for driving the truck 10 forwardly and rearwardly by means of a pair of rearwardly mounted dirigible traction wheels 16, each of which is oparatively connected by a gear train, not shown, contained in a C-shaped housing 18 to the output shaft of an electric drive motor 20. Forwardly extending legs 22 of the U-shaped frame 12 are supported at the forward end thereof by a pair of laterally spaced trail wheels 24 and comprise inwardly facing channel sections in which are mounted for extension and retraction a telescoping mast structure 26 of known construction on which is mounted a forwardly extending fork and carriage structure 28 actuatable upwardly along the upright 26 by means of hydraulic hoist means 30 which is suitably connected to the carriage 28 by sprocket and chain means, not shown. The upright structure 26 is mounted in the channel portions of legs 22 by means of L-shaped brackets 32, the legs of each of which support a roller 34, which is mounted to roll along the top surface of the leg 22, and a roller 38, which is mounted for rolling movement along a track 36 formed in the inwardmost portion of each of the legs 22. Worm gear drive means 40 are mounted in each open section 42 of the legs 22 and are connected for rotation with sprocket means 44 which are together driven by sprocket and chain means, not shown, and which are adapted to synchronously drive the mast structure 26 forwardly or rearwardly in the leg members 22 through internally threaded block members 46 mounted on the worm drive members 40 and connected to the mounting wheels 38 of brackets 32.

The body section 14 includes a rearwardly extending U-shaped portion having legs 48 which define a recess 50 in which an operator may stand to operate and work the truck 10 by means of various controls which are not shown except for a steering control lever 52, which is suitably mounted on the body portion 14.

Electric drive motor units 20 are rigidly mounted, as by bolting, on frame members 54 which are rigidly connected to vertically extending frame members 56 and 58. The outwardly facing C-shaped gear housings 18 contain a plurality of hypoid gears which connect the output shafts 60 of the motors 20 with the traction wheels 16 for supplying driving traction thereto. Swivel bearings, not shown, are mounted between the frame members 54 and the gear casings 18 for permitting the gear casings to swivel with wheels 16.

The above described structure does not constitute a part of my invention as hereinafter claimed, but is set forth to illustrate one environment in which my steering mechanism may be utilized.

Steering lever 52 is mounted on the upper surface of a bearing member 64 for limited swinging movement in both directions from a neutral position thereof. Lever 52 is fixedly mounted on a downwardly extending shaft 66 which is rotatable in bearing 64. A rearwardly extending link member 70 is fixedly connected at one end thereof to shaft 66 for rotation therewith and is pivotally connected at the opposite end thereof with a transversely extending link 72, which in turn is pivotally connected at the opposite end 74 thereof with another link 76. Link 76 is rigidly connected at one end thereof with a vertically extending shaft member 78 which is rotatably mounted at the upper end thereof in a truck body connected bearing member 80 and at the lower end thereof in a similar bearing member; at the lower end shaft 78 is fixedly connected, as by bolting or keying, with a lever 81 which is pivotally connected at its opposite end to a drag link 82. The drag link 82 is pivotally connected at 83 with a lower forwardly extending arm portion 84 of a pitman or control arm 86 which is mounted on a fixed pivot or mounting means 88 connected to a fixed frame member 90, said pivot or mounting means 88 being laterally spaced a predetermined distance to one side of the longitudinal center line of the truck. The forward end 92 of the control arm 86 is a widened portion thereof for pivotally mounting at 94 one end of a center tie rod member 96, which may be adjusted to various lengths as requirements demand by a nut member 98, and for pivotally mounting at 100 one end of a curved left hand tie rod 102 which is connected by pivot means 104 at the opposite end thereof to a bifurcated connecting member 106 in turn rigidly connected to and extending rearwardly from the gear train housing 18. A second pitman or control arm 108 which is equal in length to control arm 86, is pivotally connected at a widened portion 110 thereof to the opposite end of center tie rod 96 at 112 and to one end of a right hand tie rod 114 at 116. The tie rod 114 is equal in effective length and is of the same configuration as is tie rod 102, and is pivotally connected at the opposite end 120 thereof to a member 122 of the other wheel 16 in the same manner as is tie rod 102 connected to member 106. The rearward end of control arm 108 is pivotally mounted in a pivot or mounting means 124 which is laterally spaced from pivot means 88 in a plane transverse to the truck axis at the same predetermined distance from the longitudinal axis of the truck as is pivot means 88. The pivot or mounting means 124 is mounted at a somewhat higher elevation than is the pivot means 88 so that the control arm 108 crosses over the control arm 86 to form what is herein termed a crossed intermediate control arm steering linkage which generally comprises crossed control arms such as arms 86 and 108 (arms 140 and 146 in Figures 4–7), respective spaced pivotal fixed mountings therefor such as shown at 88 and 124 (mountings 142 and 150 in Figures 4–7), and a center tie rod member such as member 96 (member 132 in Figures 4–7) which fixes the lateral spacing between the forwardly extending ends of the control arms.

Referring now to Figures 4 through 7, which illustrate a somewhat modified form of crossed intermediate control arm steering linkage in various steering positions and wherein like parts have been numbered in the same manner as in Figures 2 and 3, a drag link 130 is pivotally mounted to steering arm 80 at 81, passes under a portion of a center tie rod 132 and left hand tie rod 102 and thence extends upwardly at 134 and horizontally at 136 to connect with a control arm 140 at a pivotal mounting means 138. Control arm 140 is mounted to rotate about a fixed pivot or mounting means 142 and extends horizontally therefrom to connect with a vertically extending pivot means 144 which is located in one end of center tie rod 132 and is adapted to pivotally mount one end of control arm 140 and one end of right hand tie rod 114 along the same vertical axis. The opposite end of center tie rod 132 similarly mounts at 148 the left hand tie rod 102 and a second control arm 146, said arm 146 being mounted at the opposite end thereof to rotate about fixed pivot or mounting means 150, the axis of which is in a common vertical plane transverse to the vehicle with the axis of pivot means 142. The control arm 146 includes a generally vertically extending central section 152 from which extend horizontally and in opposite directions upper and lower portions which pass, respectively, over the tie rod 102 to connect with pivot means 148 and under control arm 140 to connect with pivot means 150.

Figure 4:
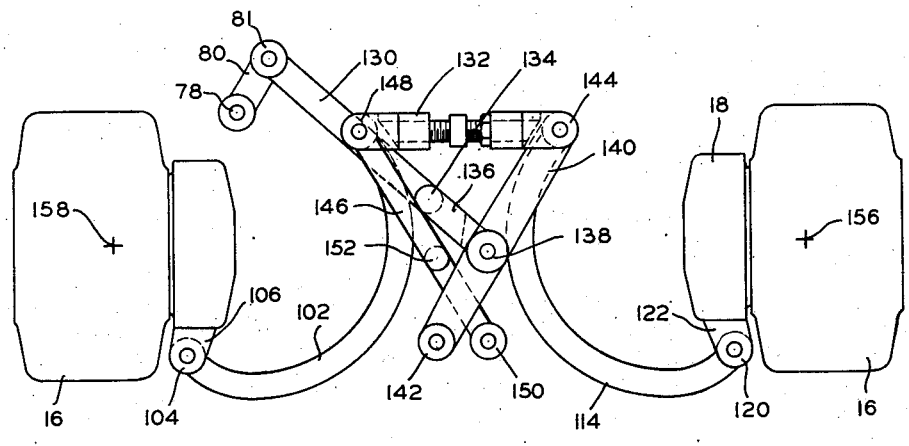
Figure 4 is a plan view of a modified steering mechanism in accordance with my invention.
Figure 5:
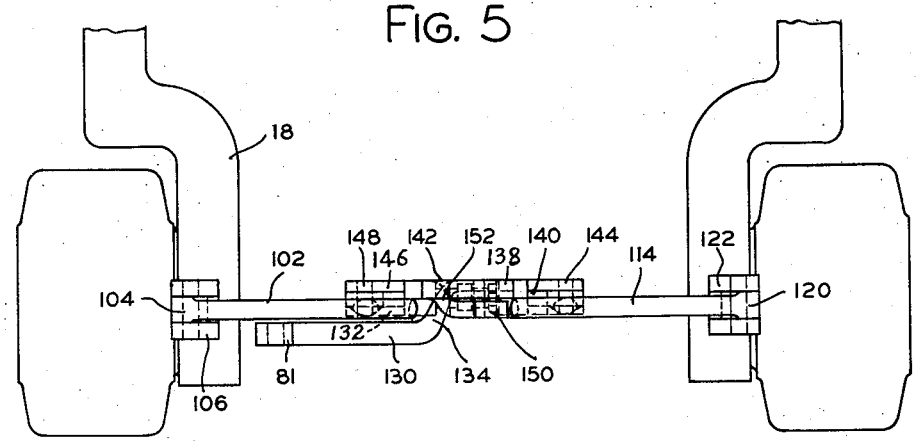
Figure 5 is a rear elevation of the mechanism shown in Figure 4.

As in the steering linkage illustrated in Figure 4, the fixed pivots 142 and 150 are laterally spaced from each other at a predetermined equal distance from a longitudinal center line of a truck, or from a longitudinal horizontal axis of symmetry of wheels 16.

Figure 6:
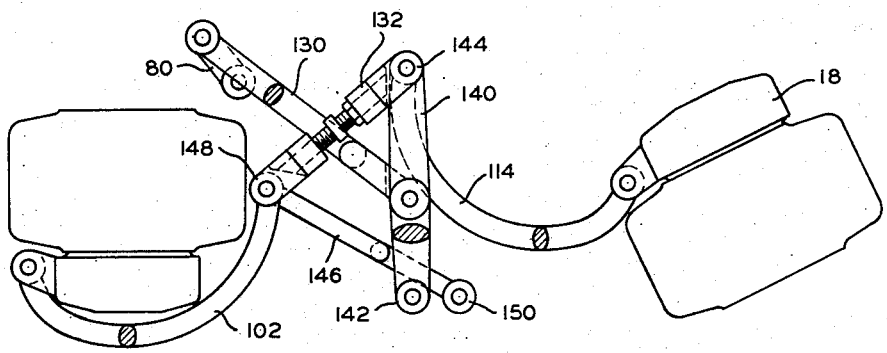
Figure 6 illustrates the steering mechanism of Figure 4 in a full left cramp position.

In Figure 6 is illustrated the various parts of the steering mechanism with the wheels in a full right cramp position in which tie rod 102 has rotated the wheel connected thereto to a position which is 90° displaced from the neutral position thereof and in which tie rod 114 has rotated the other wheel to a position which is displaced substantially less than 90° from the neutral position thereof. The difference in angular displacement of the wheels which is effected by my steering mechanism permits each of said wheels to swing in an arc about the center of rotation of said wheels with substantially no scrubbing action whatsoever as the rear portion of the truck swings leftwardly.

Figure 7:
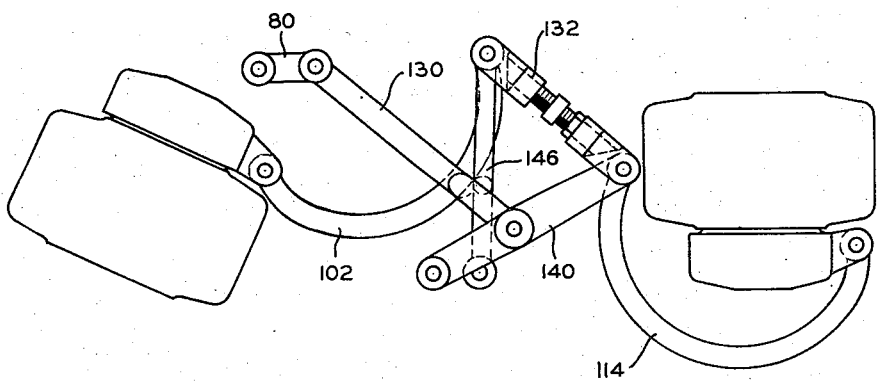
Figure 7 shows the steering mechanism of Figure 4 in a full right cramp position.

In Figure 7 is illustrated the various parts of the steering mechanism when the wheels have been actuated to a full left cramp position in which tie rod 114 has rotated the wheel connected thereto to, say, a position displaced 90° from the neutral position thereof, and tie rod 102 has rotated the other wheel to a position which is displaced from the neutral position thereof the same number of degrees less than 90° as was its counterpart in full left cramp position.

Actuation of drag link 130 towards left cramp position effects clockwise rotation of control arm 140 about the axis of pivot 142 at a radius equal to the distance between the axes of pivots 142 and 144. This causes an angular displacement of the right hand wheel by tie rod 114 as shown, and, by means of the center tie rod connection to control arm 146, effects clockwise rotation of arm 146 about the axis of pivot 150 at a radius equal to the distance between the axes of pivots 150 and 148 to cause a rotation of the left hand wheel by means of tie rod 102 as shown. Actuation of drag link 130 from the position thereof in Figure 6 to the position shown in Figure 7 effects a positioning of the control arms and tie rods as shown. Actuation of drag link 82 (Figures 2 and 3) in either direction by means of the linkage connection thereof to steering lever 52 effects differential turning of the wheels 16 by means of the hereinbefore described crossed intermediate arm steering linkage which is associated therewith in the same manner as such turning is effected by the steering linkage shown in Figures 4 through 7.

I have found that by judicious selection of the length of control arms 140 and 146 (Figures 4–7), the length of the center tie rod 132 which, by spacing the movable ends of the control arms a predetermined distance apart, fixes the position of intersection between the axes of the control arms and the angle therebetween at any given cramp position of the wheels, the lengths of the moment arms between each end pivot of the center tie rod and the pivoted connections 104 and 120 and between said latter pivoted connections and axially offset wheel pivot axes 156 and 158, and the amount of lateral displacement between the fixed pivots 142 and 150, that differential angles between the dirigble wheels are effected during turning thereof which are continuously substantially identical to the calculated optimum angular differentials therefor.

If the fixed pivots 142, 150 were replaced by a single fixed pivot located medially therebetween it is apparent that rotation of the control arms 140 and 146 about such a single pivot would produce a single circle generating movement at the center tie rod connected ends thereof. Such a construction is well known in the prior art but has proved to be unsatisfactory in use with vehicles of the type herein described, for example, wherein the wheelbase is relatively short and the tread or spread of the steering wheels is relatively narrow. One reason for this is that the differential angular displacement imparted to the dirigible wheels by such single circle generating movement of control arm ends is not sufficiently close to the optimum angular differential therefor to prevent scrubbing action of the wheels during turning movement of the vehicle.

I have found that by proper lateral displacement of the pivoted ends of control arms 140 and 146, keeping in mind the necessity of carefully selecting the overall geometric configuration of the steering mechanism as generally described above, each of the center tie rod connected ends of said control arms generates a sector of a circle which is laterally displaced from that generated by the other control arm end as the wheels are turned from one extreme position to the other. The effect of such lateral displacement of pivots 142 and 150 combined with the crossing over of arms 140 and 146 and a proper overall geometric configuration of the mechanism results in combining the aforementioned generated circular sectors such that a curve of projection results which if generated through 360° would approach an elliptical shape.

Figure 8:
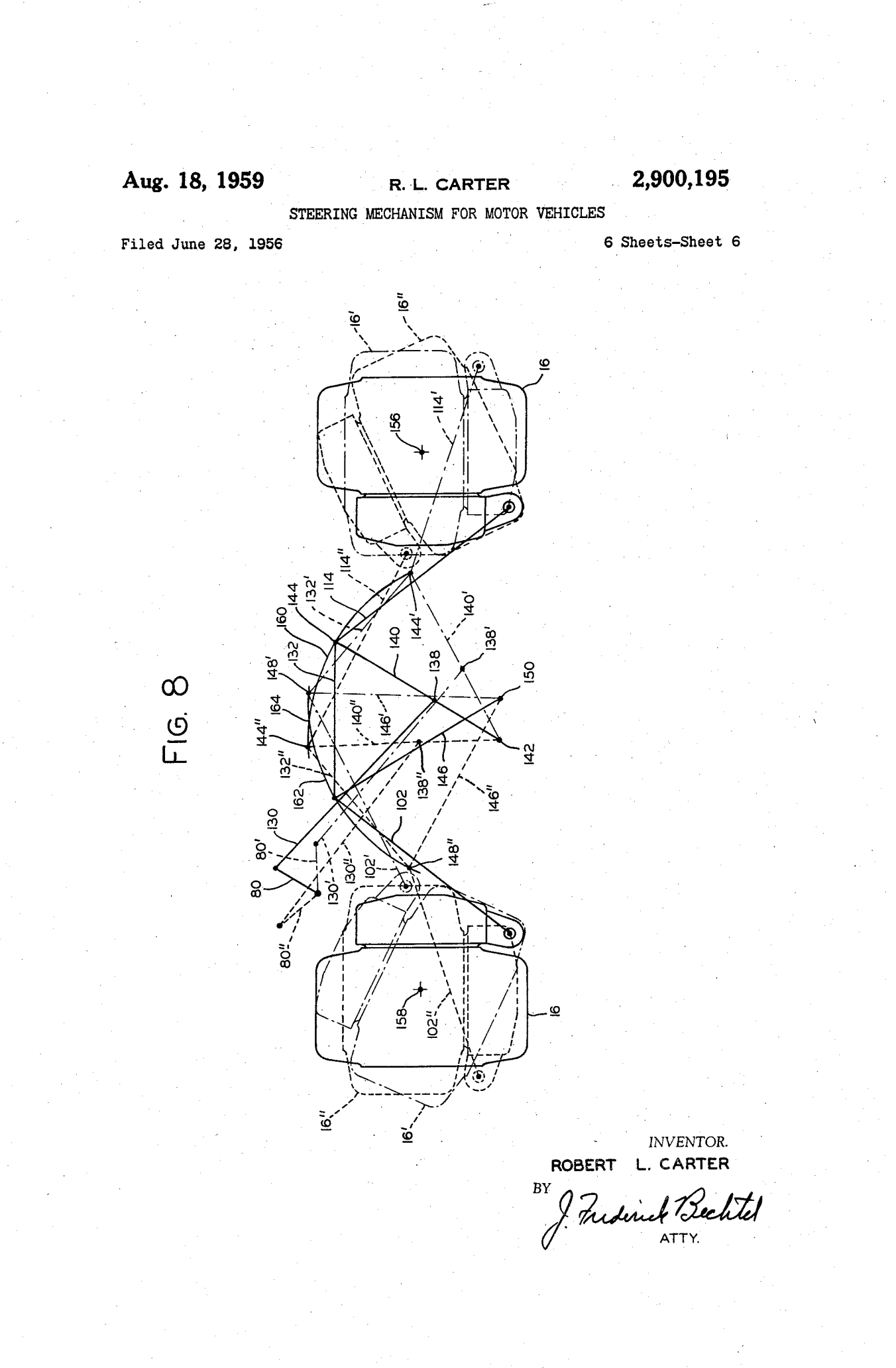

In Figure 8 I have diagrammatically illustrated a composite of Figures 4, 6 and 7 so as to more fully bring out the manner in which the above described generation of a partial elliptical-like curve is accomplished. For the sake of clarity only major parts of the steering linkage are illustrated in Figure 8, such parts being shown as lines or points of intersection of lines. The parts are numbered similarly to corresponding parts in Figures 4–7, such parts being illustrated in solid lines for the neutral position of the steering linkage, in dotted lines for the left cramp position thereof, and in center lines for the right cramp position thereof. The parts in full line or neutral position are numbered as in Figures 4–7, while the same parts in right cramp position are designated by prime numbers and in left cramp position by double prime numbers. Numeral 160 designates the circular sector which is generated by end 144 of center tie rod 132, and numeral 162 designates the circular sector which is generated by end 148 of the center tie rod as the steering linkage is actuated from a left full cramp position to a right full cramp position, or vice-versa. It will be noted that in projection the circular sectors intersect at point 164. The combination of the resulting laterally spaced arcs 160 and 162 form a sector of an approximately elliptical path.

My steering linkage effects a rate of increase of angular differential between the wheels as the steering mechanism is actuated from a neutral position to either a full right or left cramp position which is substantially more constant than such a rate of increase heretofore available with other steering linkage configurations. This rate of increase approaches a linear rate and is substantially the same as the calculated optimum rate of increase thereof.

Although the above described mode of operation of my steering mechanism has made particular reference to the embodiment thereof shown in Figures 4–7, it will be apparent that the same general mode of operation applies as well to the embodiment shown in Figures 2 and 3. However, the embodiment shown in Figures 4–7 is preferred to that shown in Figures 2 and 3 for the reason that the vertically aligned pivot means 144 and 148 on which is mounted one end of control arm 140 and tie rod 114, and control arm 146 and tie rod 102, respectively, affords a somewhat more accurate rate of change of angular differential than do the laterally spaced pivot means 116, 112 and 94, 100 on center tie rod 96 in Figures 2 and 3. The embodiment of Figures 2 and 3 may be utilized, however, with substantially more accurate results than heretofore and in a somewhat more limited vertical space than is possible with the embodiment of Figures 4–7.

Although I have described but two embodiments of my invention it will be apparent to those skilled in the art that certain modifications in the arrangement and construction of parts of which my steering mechanism is comprised may be made without departing from the scope of the invention as defined in the appended claims.

I claim:

1. A steering mechanism for vehicles having a frame and right and left hand laterally spaced dirigible wheels supported by said frame for turning movement relative thereto, comprising a right hand rod means operatively connected to the right hand wheel for turning same relative to the frame, a left hand rod means operatively connected to the left hand wheel for turning same relative to the frame, said right and left hand rod means being of equal length and of like configuration, a center rod means pivotally connected at one end thereof to said left hand rod means and at the opposite end thereof to said right hand rod means, first and second pivot means supported by the frame and spaced from each other in a direction which is transverse to the vehicle, first and second control arms respectively connecting said first and second pivot means to opposite ends of said center rod means and to said right and left hand rod means in such a manner that one of said control arms crosses over the other, and means connected to one of said control arms for rotating same about one of said pivot means.

2. In a steering mechanism for vehicles having a pair of laterally spaced dirigible wheels, a drag link, a first control arm pivotal about one end thereof and connected to said drag link, a second control arm pivotal about one end thereof and mounted in crossed relation to the first control arm, a center rod means interconnecting the opposite ends of said first and second control arms, a first tie rod connecting said opposite end of said first control arm to one of the wheels for effecting turning movement thereof, and a second tie rod connected to said opposite end of said second control arm and to the other of said wheels for effecting turning movement thereof in such predetermined relation to the turning movement of the first wheel that substantially optimum angular differential between said wheels is effected upon actuation of said control means from a neutral position thereof.

3. A steering mechanism as claimed in claim 2 wherein said opposite end of each of said first and second control arms is mounted on the center tie rod in vertically displaced relation to a nearest one end of said wheel connected tie rods.

4. A steering mechanism as claimed in claim 2 wherein said opposite end of each of said first and second control arms is mounted on the center tie rod in laterally displaced relation to a nearest one end of said wheel connected tie rods.

5. A steering mechanism for vehicle having a pair of laterally spaced dirigible wheels comprising a crossed intermediate control arm steering linkage including a pair of control arms which are crossed during operation and have the adjacent one ends thereof pivotally mounted to a portion of the vehicle and a rigid member pivotally connected to the opposite ends thereof, curved rod means connecting said opposite end of each control arm to one of the wheels, and a drag link pivotally connected to one of said control arms for actuating said crossed control arm steering linkage together with said curved rod means whereby to effect a turning of said wheels.

6. In a steering mechanism for vehicles having a pair of laterally spaced dirigible wheels, a first control arm pivotal about one end thereof, a second control arm pivotal about one end thereof and mounted in crossed relation to the first control arm, a center rod means interconnecting the opposite ends of said first and second control arms, a first curved tie-rod operatively connecting said opposite end of said first control arm to one of the wheels for effecting turning movement thereof, and a second curved tie-rod operatively connecting said opposite end of said second control arm to the other of said wheels for effecting turning movement thereof, said one end of said first control arm being relatively closely adjacent to said one end of said second control arm and said opposite end of said first control arm being relatively remote from said opposite end of said second control arm, whereby said first control arm crosses said second control arm relatively closely adjacent to said one ends of said control arms and whereby concurrent pivotal movement of said control arms about said one ends thereof causes movement of said opposite ends thereof in separate paths which generate a pair of laterally displaced overlapping arcs which together form an approximately elliptical sector, thereby effecting substantially optimum angular differential between said wheels during turning movement thereof.

7. In a steering mechanism for vehicles having a pair of laterally spaced dirigible wheels, a first control arm pivotal about one end thereof, a second control arm pivotal about one end thereof and mounted in crossed relation to the first control arm, a center rod means interconnecting the opposite ends of said first and second control arms, a first tie-rod operatively connecting said opposite end of said first control arm to one of the wheels for effecting turning movement thereof, and a second tie-rod operatively connecting said opposite end of said second control arm to the other of said wheels for effecting turning movement thereof, said opposite end of each of said first and second control arms being mounted on the center rod means in laterally displaced relation to a nearest one end of said first and second tie-rods, said one end of said first control arm being relatively closely adjacent to said one end of said second control arm and said opposite end of said first control arm being relatively remote from said opposite end of said second control arm, whereby said first control arm crosses said second control arm relatively closely adjacent to said one ends of said control arms and whereby concurrent pivotal movement of said control arms about said one ends thereof causes movement of said opposite ends thereof in separate paths which generate a pair of laterally displaced overlapping arcs which together form an approximately elliptical sector, thereby effecting substantially optimum angular differential between said wheels during turning movement thereof.

References Cited in the file of this patent

UNITED STATES PATENTS

| | | |
|---|---|---|
| 2,191,961 | Howell | Feb. 27, 1940 |
| 2,559,142 | Woodworth | July 3, 1951 |

FOREIGN PATENTS

| | | |
|---|---|---|
| 364,054 | Italy | Oct. 21, 1938 |
| 216,859 | Switzerland | Jan. 16, 1942 |
| 435,534 | France | Dec. 27, 1911 |